US011356506B2

(12) United States Patent
Mamadapur et al.

(10) Patent No.: US 11,356,506 B2
(45) Date of Patent: Jun. 7, 2022

(54) SYSTEM FOR OPTIMIZING DATA ACCEPTANCE AND DATA STORAGE IN A DISTRIBUTED COMPUTING NETWORK (71) Applicant: BANK OF AMERICA CORPORATION, Charlotte, NC (US)

(72) Inventors: Krishna Rangarao Mamadapur, Pune (IN); Jigesh Rajendra Safary, Mumbai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/060,208

(22) Filed: Oct. 1, 2020

(65) Prior Publication Data

US 2022/0109723 A1 Apr. 7, 2022

(51) Int. Cl.
*H04L 67/1074* (2022.01)
*H04L 67/1097* (2022.01)
*H04L 43/0852* (2022.01)
*H04L 67/1087* (2022.01)
*H04L 43/0882* (2022.01)
*H04L 67/1008* (2022.01)

(52) U.S. Cl.
CPC ...... *H04L 67/1076* (2013.01); *H04L 43/0852* (2013.01); *H04L 43/0882* (2013.01); *H04L 67/1008* (2013.01); *H04L 67/1089* (2013.01); *H04L 67/1097* (2013.01)

(58) Field of Classification Search
CPC ............. H04L 67/1076; H04L 67/1089; H04L 43/0852; H04L 67/1008; H04L 67/1097; H04L 43/0882
See application file for complete search history.

(56) References Cited

U.S. PATENT DOCUMENTS

| | | |
|---|---|---|
| 6,363,371 B1 | 3/2002 | Chaudhuri et al. |
| 8,271,974 B2 | 9/2012 | Mazhar et al. |
| 9,009,825 B1 | 4/2015 | Chang et al. |
| 9,807,106 B2 | 10/2017 | Daniel et al. |
| 10,048,996 B1 | 8/2018 | Bell et al. |
| 10,116,507 B2 | 10/2018 | Thomas |
| 10,210,567 B2 | 2/2019 | Mick et al. |
| 10,355,869 B2 | 7/2019 | Bisti |
| 10,432,411 B2 | 10/2019 | Barinov et al. |
| 10,445,302 B2 | 10/2019 | Childress et al. |
| 10,509,919 B1 | 12/2019 | Wang et al. |
| 10,587,467 B2 | 3/2020 | Anderson et al. |
| 10,601,665 B2 | 3/2020 | Bathen et al. |

(Continued)

*Primary Examiner* — Brian Whipple
*Assistant Examiner* — James Ross Hollister
(74) *Attorney, Agent, or Firm* — Moore & Van Allen PLLC; Nicholas C. Russell (57) ABSTRACT A system for optimizing data acceptance and data storage in distributed computing network may be configured to implement tuning algorithms in order to improve the performance of a data requests in the distributed computing network. The tuning algorithms may be applied based on identifying components of the distributed computer network that are performing below an optimal level. Tuning algorithms may comprise implementing a parallel validation process; restructuring a memory hierarchy for fast data access; increasing a number of endorsing peers; increasing a number of transactions per node; reducing a number of node commits; implementing an event handling strategy; or other similar mechanisms.

18 Claims, 4 Drawing Sheets

(56) References Cited

U.S. PATENT DOCUMENTS

| | | |
|---|---|---|
| 10,679,210 B2 | 6/2020 | Ardashev et al. |
| 10,771,241 B2 | 9/2020 | Yang |
| 10,853,750 B2 | 12/2020 | Daniel et al. |
| 11,269,859 B1 * | 3/2022 | Luedtke ................ G06F 16/248 |
| 2008/0071748 A1 | 3/2008 | Wroblewski et al. |
| 2014/0281726 A1 * | 9/2014 | Garrett ................ G06F 11/3612 |
| | | 714/37 |
| 2017/0337534 A1 | 11/2017 | Goeringer et al. |
| 2018/0189333 A1 | 7/2018 | Childress et al. |
| 2018/0210801 A1 | 7/2018 | Wu et al. |
| 2018/0300382 A1 * | 10/2018 | Madisetti .............. H04L 9/3263 |
| 2019/0156332 A1 | 5/2019 | Christidis et al. |
| 2019/0236598 A1 * | 8/2019 | Padmanabhan ........ G06N 20/00 |
| 2019/0306021 A1 * | 10/2019 | Mazhar ............... H04L 41/5064 |
| 2020/0052881 A1 * | 2/2020 | Hwang ............... G06F 16/2379 |
| 2020/0311053 A1 * | 10/2020 | Verma ................ H04L 67/1097 |
| 2021/0133158 A1 * | 5/2021 | Bono .................... G06F 16/188 |
| 2021/0168061 A1 * | 6/2021 | Kolesnik ............ H04L 12/4641 |

* cited by examiner

SYSTEM FOR OPTIMIZING DATA ACCEPTANCE AND DATA STORAGE IN A DISTRIBUTED COMPUTING NETWORK

FIELD OF THE INVENTION

The present disclosure embraces a system, computer program product, and computer-implemented system and method for optimizing data acceptance and data storage in a distributed computer network.

BACKGROUND

The performance of distributed computer networks may be hindered by one or more nodes or other components of the distributed computer networks causing a bottleneck in network traffic. Due to the nature of the distributed computer network, it is often difficult to identify the cause of the bottleneck and apply appropriate correctional measures in order to improve performance of the distributed computer network. Therefore, a need exists for an automated system to identify and optimize the performance of a distributed computer network. The present invention provides such a system.

BRIEF SUMMARY OF THE INVENTION

The following presents a simplified summary of one or more embodiments of the invention in order to provide a basic understanding of such embodiments. This summary is not an extensive overview of all embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, computer program products, and methods for optimizing data acceptance and data storage in a distributed computer network. Embodiments of the present invention comprise one or more processor components, one or more memory components operatively coupled to the one or more processor components, and computer-readable instructions stored on the one or more memory components configured to identify a request from a client device to initiate a transaction on the distributed computer network; capture one or more load parameters associated with the distributed computer network; determine that the load parameter is below a predetermined threshold; capture a transaction timing of one or more components in the distributed computer network; identify at least one of the one or more components in the distributed network for optimization; and apply a tuning mechanism on the one or more components.

In some embodiments of the present invention, the tuning mechanism comprises at least one of (i) implementing a parallel validation process; (ii) restructuring a memory hierarchy for fast data access; (iii) increasing a number of endorsing peers; (iv) increasing a number of transactions per node; (v) reducing a number of node commits; and (vi) implementing an event handling strategy.

In still other embodiments of the invention, the system is further configured to repeat each step until the load parameter is above the predetermined threshold.

In still other embodiments of the invention, the predetermined threshold is based on a theoretical maximum throughput of the system.

In embodiments of the invention wherein the tuning mechanism comprises at least restricting a memory hierarchy for fast data access, restricting the memory hierarchy may comprise instructing one or more nodes to use an in-memory hash table.

In embodiments of the invention wherein the tuning mechanism comprises implementing an event handling strategy, implementing an event handling strategy may comprise instructing the client to change from a synchronous to an asynchronous waiting period.

In embodiments of the invention wherein capturing one or more load parameters associated with the distributed computer network comprises capturing one or more timings of one or more nodes in the distributed computer network, the system may further be configured to identify at least one of the one or more nodes as a bottleneck based on the captured timings.

DETAILED SUMMARY OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the extended recognition system described herein is implemented. The entity may be a business organization, a non-profit organization, a government organization, and the like.

"Entity system" as used herein may refer to the computing systems and/or other resources used by the entity to execute DISTRIBUTED COMPUTER and non-DISTRIBUTED COMPUTER functions.

"User" as used herein may refer to an individual who may interact with the entity system. Accordingly, the user may be an employee, associate, contractor, or other authorized party who may access, use, administrate, maintain, and/or manage the computing systems within the entity system.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Distributed ledger" or "distributed electronic ledger" as used herein may refer to a structured list of data records that is decentralized and distributed amongst a plurality of computing systems and devices. In some embodiments, the distributed ledger may be a blockchain ledger. "Node" as used herein may refer to a computing system on which the distributed ledger is hosted. Typically, each node maintains a full copy of the distributed ledger.

"Distributed computer network" as used herein may refer to a network of servers, computer systems or other computing devices configured to perform at least some distributed-transactions.

"Consensus," "consensus algorithm," or "consensus mechanism" as used herein may refer to the process or processes by which nodes come to an agreement with respect to the contents of the distributed ledger. Typically, changes to the ledger (e.g., addition of data records) may require consensus to be reached by the nodes in order to become a part of the authentic version of the ledger. The nodes may use various different mechanisms or algorithms to obtain consensus, such as proof-of-work ("PoW"), proof-of-stake ("PoS"), practical byzantine fault tolerance ("PBFT"), or the like.

"Resource" as used herein may refer an object which is typically transferred between the third party and the entity. The object may be tangible or intangible objects such as computing resources, data files, documents, funds, and the like.

Embodiments of the present disclosure provide a system, computer program product, and method for optimizing data acceptance and data storage in a distributed computer network. In particular, the system may be configured to apply tuning algorithms to one or more nodes within a distributed computer network in order to improve data acceptance and storage. For example, the systems described herein may add additional nodes to increase the validator pool size for processing transactions. The system may also instruct a node to use an in-memory hash table to store the world state instead of relying on a database to improve data access times. The system may also add additional endorsing peers. Further, each ordering node in the distributed computer network can have the number of transactions (described in more detail herein) increased by the system. Other tuning algorithms may be described in more detail herein with respect to FIGS. 3 and 4.

In general, the distributed computer networks as described herein are comprised of a number of nodes connected of a network. The nodes may be a server or other computing device that is capable of performing distributed computer network functions, including communication with other nodes on the distributed computer network, executing consensus algorithms to determine contents of a distributed ledger (e.g., validating data records and/or approving or rejecting additional data records), forming smart contracts, or the like. In a distributed computer network, some nodes may be permissioned, while other nodes are not—in other words, only a subset of all of the nodes in a distributed computer network may be able to participate in the performing the consensus algorithm or other distributed computer-functions affecting the distributed ledger. In distributed computer networks as described herein, the nodes may exist on a variety of commercially available private/public cloud infrastructures, including Docker, Kubernets, Openshift, and the like. The various infrastructures may be established to serve different uses, depending on the needs of the authorized user. Further, a user may require different ledger types to establish the distributed ledger on the distributed computer network. For example, different use case may be well suited for Corda, while other use cases may require Hyperledger Fabric, Ethereum, or some other commercially available distributed ledger. Lastly, the distributed computer networks provisioned according to embodiments of the present invention may use specific programming languages to perform the distributed computer network-functions (e.g., node.js) and require access to specific relational or memory databases.

Figure 1:
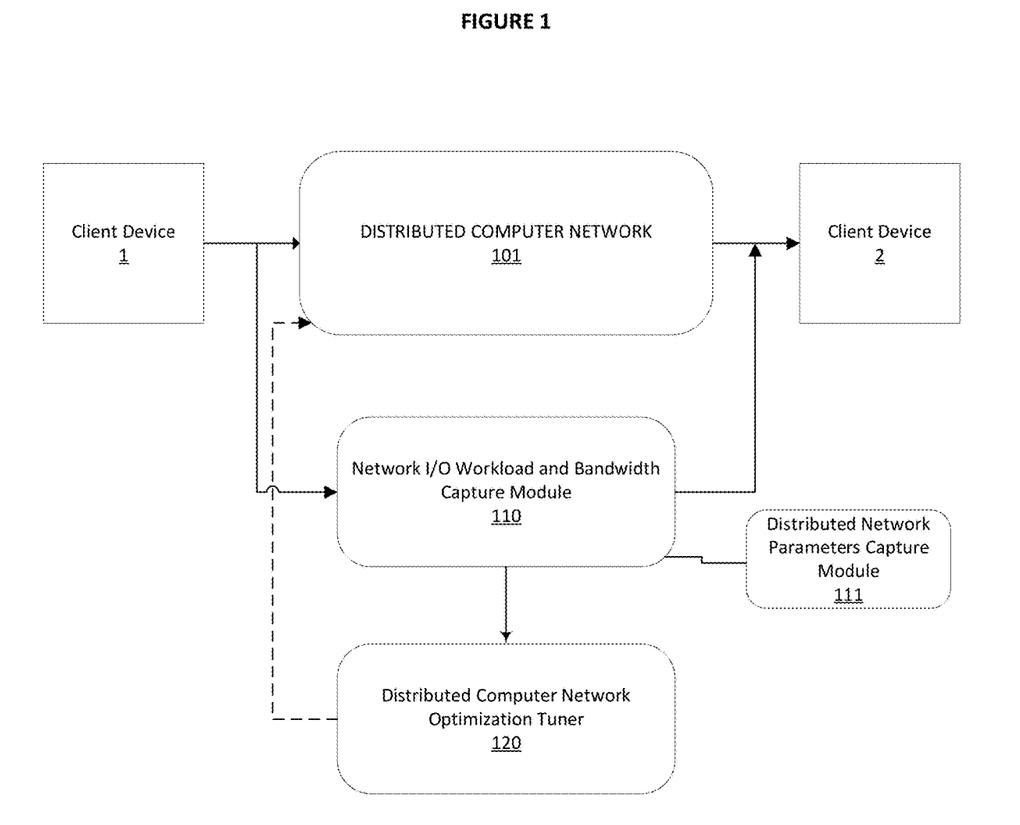
FIG. 1 is a system diagram depicting an exemplary embodiment of the invention.

FIG. 1 depicts an exemplary embodiment of the system in accordance with embodiments of the invention. As shown in FIG. 1, the system comprises a distributed computer network 101, a network I/O and bandwidth capture module 110 (or as used herein, the "network capture module"), a distributed computer network operation tuner 120, and client devices 1 and 2.

The distributed computer network may be any distributed computer network capable of organizing and maintaining a distributed ledger as described herein. The distributed computer network may be comprised of one or more desktops, laptops, servers, or other computing devices that are connected to one another over a network. The distributed network is configured to process one or more transactions as requested by the client device 1 and may be configured to output the results of such transactions to client device 2. It should be understood that client device 1 and 2 may be separate devices or the same device. The distributed computer network and transaction process are discussed in more detail below with respect to FIGS. 2 and 3.

The network capture module 110 is configured to capture the input/output parameters and network bandwidth parameters associated with the transactions on the distributed computer network. The data captured by the network capture module 110 is used by the distributed computer network operation tuner 120 to identify bottlenecks or other performance issues in the distributed computer network 101 and to implement tuning mechanism in order to remedy the same, as described in more detail herein. The network capture module is depicted in FIG. 1 as a singular module that is connected at the input and output of the distributed network 101; however, it should be understood that the network capture module may comprise several components that are placed at various nodes within the distributed computer network. In this sense, the network capture module can be configured to measure input/output parameters and network bandwidth parameters of each node (or a subset of nodes) within the distributed computer network 101. The network capture module may be configured to capture both the input/output parameters (e.g., load) and network bandwidth of the distributed computer network 101 in its entirety, or to capture timings in the performance of transactions at individual nodes within the distributed computer network, as discussed in more detail herein. The network capture module 110 may further comprise a distributed computer network parameter capture module 111, which may be configured to capture the timings of the transactions that occur within each node of the distributed computer network (e.g., proposal execution, validation, etc.). As used herein, the network capture module 111 may be described as performing the functions of the distributed computer network module 111.

The distributed computer network optimization tuner 120 provides the analytics and machine learning algorithms necessary to provide tuning instructions to the distributed computer network 101 in order to improve performance. In general, the distributed computer network optimization tuner 120 receives the data captured by the network capture module 110 for processing, analysis and tuning. The network optimization tuner 120 may use artificial intelligence such as a deep learning neural network to analyze the network timings provided by the network capture module 110 and generate customized tuning to improve performance in the distributed computer network.

The tuning algorithms implemented by the distributed computer network optimization tuner 120 are each designed in order to improve the processing speed and efficiency of the distributed computer network 101 as measured in total throughput per second. Exemplary embodiments of the present invention may improve throughput by upwards of 20 percent. The tuning algorithms implemented by the distributed computer network optimization tuner 120 in an exemplary embodiment typically comprise one or more of the following: (i) implementing a parallel validation process; (ii) restructuring the memory hierarchy for fast data access; (iii) increasing the number of endorsing peers; (iv) increasing the number of transactions per node; (v) reducing the number of node commits; and (vi) event handling strategy.

Figure 3:
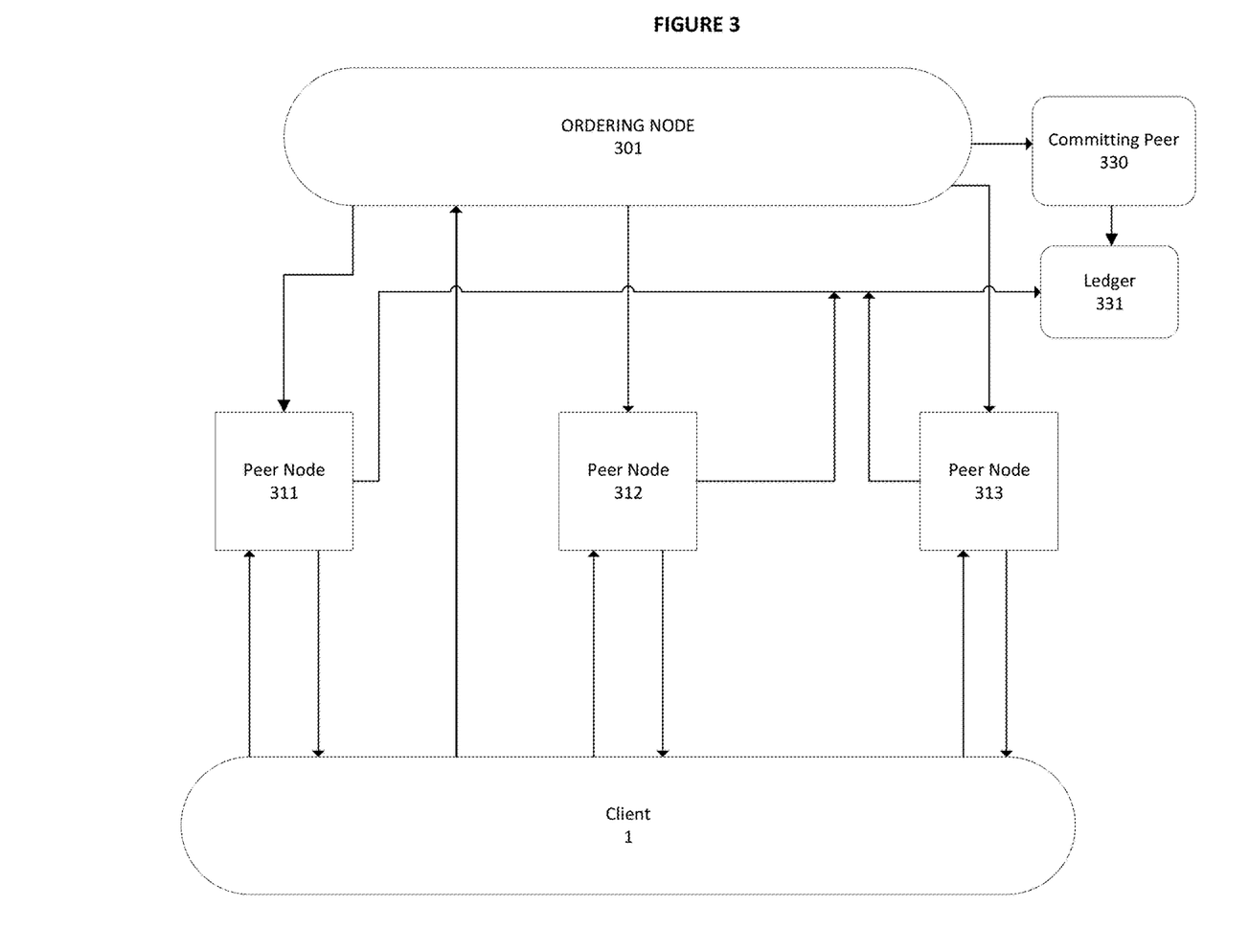
FIG. 3 is an exemplary transaction occurring in a distributed computer network according to embodiments of the invention.

Implementing a parallel validation process comprises increasing the validator pool of the distributed computer network. The validator pool is comprised of endorsing peers as depicted in FIG. 3. By increasing the number of endorsing peers and thereby increasing the validator pool size, the distributed computer network 101 can utilize the increased parallel processing capabilities of a larger validator pool, thereby improving the efficiency of the validation process.

Restructuring the memory hierarchy for fast data access comprises reconfiguring nodes to utilize in-memory hash tables to store world states instead of storing the same in a separate database. Thus, endorsing peers will have faster access to the in-memory hash tables, improving the performance of the validations process by reducing the amount of time each endorsing peer needs to look up data.

Increasing the number of endorsing peers also permits performance scaling. For example, in a typical distributed computer network 101 that has only a single endorsing peer, the tuning algorithm may suggest increasing the number of endorsing peers to five. Such increased number of endorsing peers would be expected to improve the performance of the distributed computer network 101 by up to twenty percent (20%).

Increasing the number of transactions per node can be tuned in the ordering node, which will transmit the block of transactions to the endorsing peers. Thus, each endorsing peer will then endorse an increasing number of transactions per block, improving performance.

Reducing node commits refers to reducing the number of commits at each node in order to reduce node processing time. Large number of node commits is often a leading contributor to bottlenecks in the distributed computer network 101. Accordingly, reducing the number of commits each node is required to make can dramatically improve the throughput performance of the distributed computer network 101.

Lastly, the distributed computer network optimization tuner 120 can adjust the event handling strategy of the client device (as shown in FIG. 3). The event handling strategy adjustment may instruct the client to change from a synchronous to asynchronous waiting period for commit events from the peer nodes after a transaction is committed to the ledger. By switching to asynchronous, the client device may not have to wait for each peer to commit the transaction to the ledger, but proceed with additional transactions after a threshold number of peers have committed the transaction.

Figure 2:
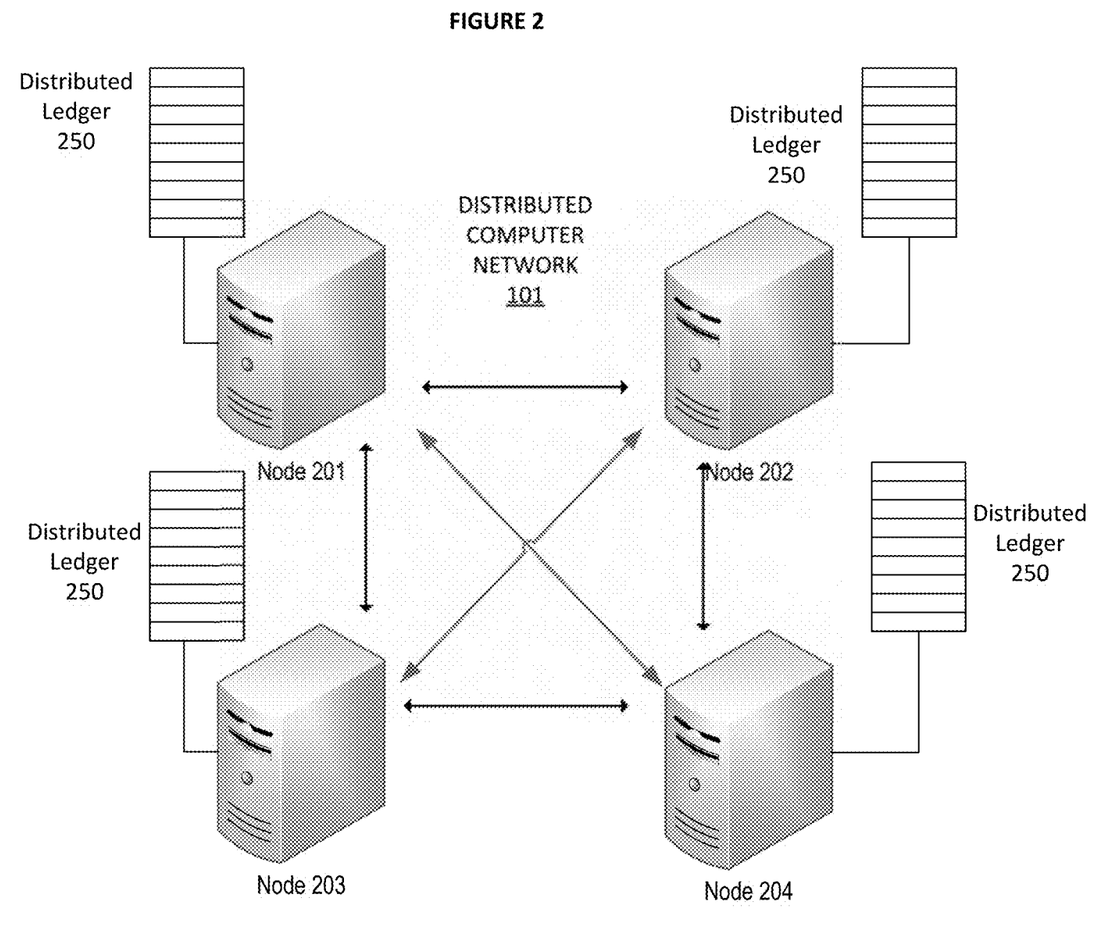
FIG. 2 is a system diagram depicting a distributed computer network according to embodiments of the invention.

FIG. 2 depicts a more detailed system diagram of a fully provisioned distributed computer network 101 according to embodiments of the invention as described herein. As shown in FIG. 2, the distributed computer network 101 is comprised of one or more nodes (specifically, the distributed computer network 101 in FIG. 2 has 4 nodes, but it is understood that the distributed computer networks provisioned according to embodiments described herein may have any number of nodes). Each node in the distributed computer network 101 is in operative communication with the other nodes in the distributed computer network 101, in order to facilitate necessary distributed computer functionality. The distributed computer network 101 may be a global area network (GAN) such as the Internet, a wide area network (WAN), a local area network (LAN) or any other type of network or combination of networks in accordance with the requirements provided by the authorized user. The network may provide for wireline, wireless or a combination of wireline and wireless communication between devices on the network.

As shown, the distributed computer network 101 of FIG. 2 is comprised of a first distributed computer node 201, a second distributed computer node 202, a third distributed computer node 203, and a fourth distributed computer node 204. Each node also has a copy of a distributed ledger 250, which should be the same on each node. In order to conduct transactions on the distributed computer network 101, each node needs to append its copy of the distributed ledger 250 with the same information as the other nodes on the distributed computer network 101. Embodiments of the present invention as described herein can configured the distributed computer network 101 (and the corresponding nodes comprising the distributed computer network 101) to perform these functions in any manner, including by consensus algorithm, smart contract logic, or the like.

It should be understood by those having ordinary skill in the art that although the first distributed computer node 201, second distributed computer node 202, third distributed computer node 203, and fourth distributed computer node 204 are depicted as single units, each of the depicted components, or sub-components therein, may represent multiple units. In some embodiments, a given computing system as depicted in FIG. 2 may represent multiple systems configured to operate in a distributed fashion. For instance, the first distributed computer node 201 may represent a plurality of computing system operating in a distributed fashion. In other embodiments, the functions of multiple computing systems may be accomplished by a single system. For instance, the functions of the second distributed computer node 202 may, in some embodiments, be executed on a single computing system according to the authorized user's need to efficiently distribute computing workloads.

FIG. 3 depicts a sample transaction process flow in a distributed computer network in accordance with embodiments of the present invention. As shown in FIG. 3, a transaction in the distributed computer network 101 will comprise a client 1, one or more peer nodes 311, 312 and 313, an ordering node 301, a committing peer 330 and a ledger 331. A transaction begins when a client initiates one or more transaction, which it sends to the peer nodes 311, 312 and 313. Peer nodes 311, 312 and 313 are endorsing peers, which after the client initiates the transaction, endorse the transaction and transmit such endorsement back to the client 1. The client 1 then sends the endorsed transaction to the ordering node. Once the ordering node receives the endorsed transaction from the client 1, the ordering node then creates a block of transactions and transmits the block to the endorsing peers 311, 312 and 313. Additionally, the ordering node 301 transmits the endorsed transaction to the committing peers 330, which then validate the block of transactions and commit the block to a local copy of the ledger 331. Once the foregoing process is completed, the client 1 may initiate another transaction to be processed in accordance with the same process.

The tuning algorithms applied in accordance with embodiments of the invention are aimed at improving the throughput of transactions occurring according to the process depicted in FIG. 3. As described herein, the distributed network computer optimization tuner 120 receives timing data of each of the transaction processes described in the preceding paragraph. The distributed network computer optimization tuner 120 then analyzes the timings received from the network capture module 110 and applies artificial intelligence/machine learning algorithms to generate an optimal tuning plan to maximize the distributed computer's network performance. As discussed herein, the distributed network computer optimization tuner 120 may implement a number of tuning algorithms, including (i) implementing a parallel validation process; (ii) restructuring the memory hierarchy for fast data access; (iii) increasing the number of endorsing peers; (iv) increasing the number of transactions per node; (v) reducing the number of node commits; and (vi) event handling strategy.

Figure 4:
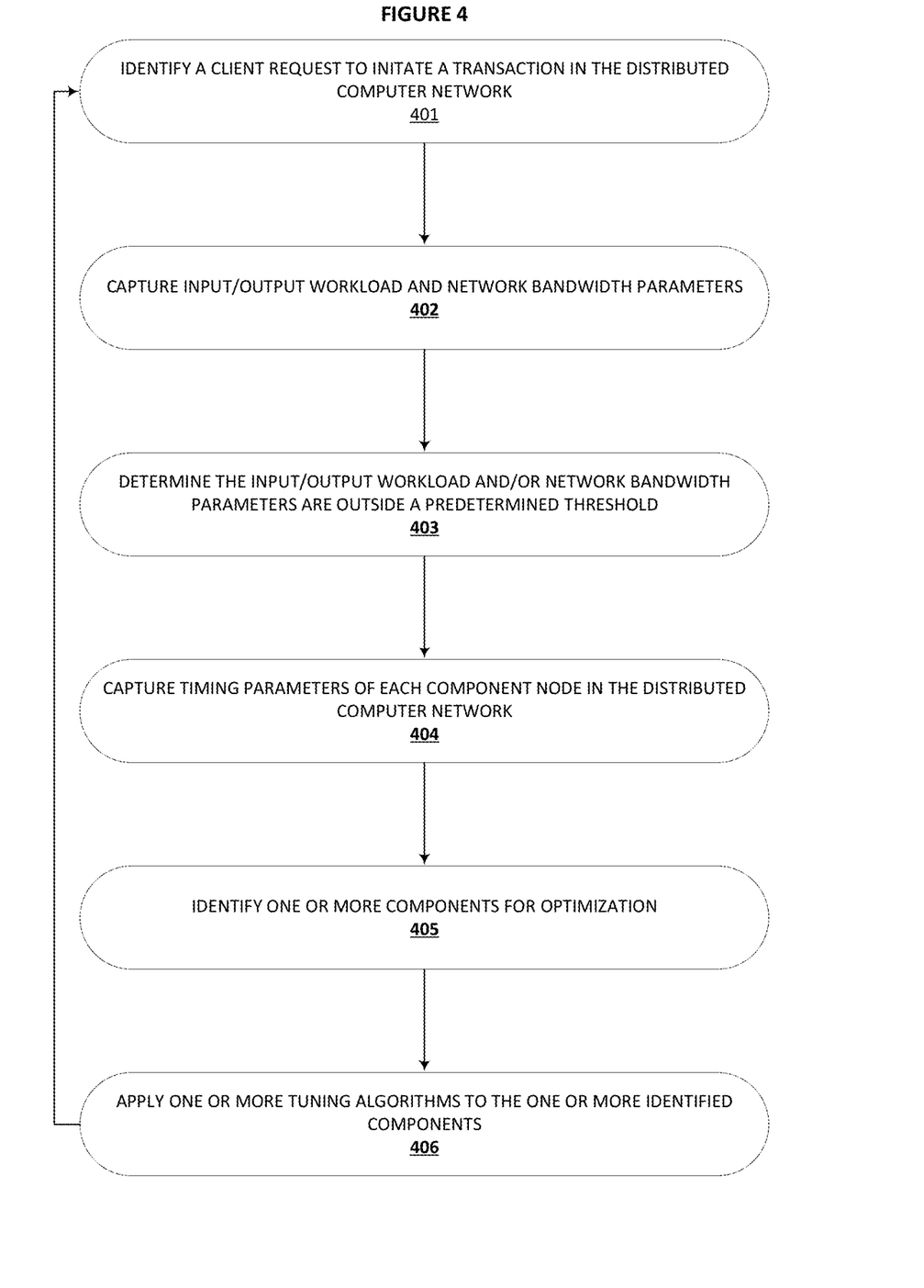
FIG. 4 is a flow chart depicting an exemplary process flow according to embodiments of the invention.

FIG. 4 depicts an exemplary process flow of a system for optimizing data acceptance and data storage in a distributed computer network in accordance with embodiments of the invention described herein. As shown in FIG. 4, the process flow begins at block 401, where the system identifies a request from a client device 1 to initiate a transaction in a distributed computer network 101. As discussed with respect to FIG. 3, the request from the client device 1 will be transmitted to one or more endorsing peers 311, and then signed and sent to an order node 301 once the endorsing peer 311 has endorsed the transaction.

At block 402, the system captures the input/output workload and network bandwidth parameters associated with the distributed computer network 101. The input/output work load and network bandwidth parameters comprise at least a throughput per second.

At block 403, the system determines that the input/output workload and network bandwidth parameters are below a predetermined threshold. The predetermined threshold may be based on a theoretical maximum throughput calculations, or the predetermined threshold may be a set by an administrator for the distributed computer network 101.

At block 404, the system captures the timing of each component involved in processing the transaction—i.e., the individual nodes comprising the distributed computer network 101. Specifically, the system captures the timings involved in the endorsement of the transaction, the validation processes, and the commitment of the transaction to the ledger. Those processes are described in greater detail with respect to FIG. 3.

At block 405, the system identifies one or more components of the distributed computer network 101 for optimization. The component may be a committing peer node, an endorsing peer node, an ordering node, or any other component of the distributed computer network 101. The node identified at block 405 may be a node that is determined by the system as a "bottleneck"—or a node that causes the transaction processing to be slower or otherwise less efficient than an optimized system. This analysis may be performed by the distributed computer network optimization tuner 120 that performs deep neural network analysis using the timings captured at block 404. This analysis may determine that a particular node in the distributed computer network 101 is causing the "bottleneck", and thus, the performance will improve by applying a tuning algorithm as described herein.

At block 406 the system applies one or more tuning algorithms to one or more components in the distributed computer network 101. As discussed herein, the one or more tuning algorithms may comprise: (i) implementing a parallel validation process; (ii) restructuring the memory hierarchy for fast data access; (iii) increasing the number of endorsing peers; (iv) increasing the number of transactions per node; (v) reducing the number of node commits; and (vi) event handling strategy. After the one or more tuning algorithms have been applied at block 406, the process will run again beginning at block 401 to determine whether the tuning algorithms successfully improved the performance of the distributed computer network 101 such that the measured throughput per second is below the predetermined threshold.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software-defined radio systems and machine learning algorithms to be performed thereon.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for optimizing data acceptance and data storage in a distributed computer network:
   one or more processors;
   one or more memories operatively coupled to the one or more processors;
   computer-readable instructions stored on the one or more memories and configured to cause the one or more processors to:
   identify a request from a client device to initiate a transaction on the distributed computer network;
   capture one or more load parameters associated with the distributed computer network;
   determine that a load parameter is below a predetermined threshold;
   capture a transaction timing of one or more components in the distributed computer network, wherein capturing the transaction timing of one or more components comprises capturing a processing time of the transaction at the one or more components;
   perform a neural network analysis on the captured transaction timings of the one or more components;
   based on the neural network analysis, identify at least one of the one or more components in the distributed computer network for optimization; and
   apply a tuning mechanism on the one or more components, wherein the tuning mechanism comprises at least restricting a memory hierarchy for data access, wherein restricting the memory hierarchy comprises instructing one or more nodes to use an in-memory hash table.

2. The system of claim 1, wherein the tuning mechanism further comprises at least one of (i) implementing a parallel validation process; (ii) increasing a number of endorsing peers; (iii) increasing a number of transactions per node; (iv) reducing a number of node commits; and (v) implementing an event handling strategy.

3. The system of claim 1, wherein the system is further configured to repeat each step until the load parameter is above the predetermined threshold.

4. The system of claim 1, wherein the predetermined threshold is based on a theoretical maximum throughput of the distributed computer network.

5. The system of claim 1, wherein the tuning mechanism comprises implementing an event handling strategy, wherein implementing the event handling strategy comprises instructing the client device to change from a synchronous to an asynchronous waiting period.

6. The system of claim 1, wherein capturing one or more load parameters associated with the distributed computer network comprises capturing one or more timings of one or more nodes in the distributed computer network, and wherein the system is further configured to identify at least one of the one or more nodes as a bottleneck based on the captured timings.

7. A computer program product for optimizing data acceptance and data storage in a distributed computer network, the computer program product comprising at least one non-transitory computer readable medium comprising computer readable instructions, the instructions comprising instructions to: identify a request from a client device to initiate a transaction on the distributed computer network; capture one or more load parameters associated with the distributed computer network; capture a transaction timing of one or more components in the distributed computer network, wherein capturing the transaction timing of one or more components comprises capturing a processing time of the transaction at the one or more components; perform a neural network analysis on the captured transaction timings of the one or more components; based on the neural network analysis, identify at least one of the one or more components in the distributed computer network for optimization; and apply a tuning mechanism on the one or more components, wherein the tuning mechanism comprises at least restricting a memory hierarchy for data access, wherein restricting the memory hierarchy comprises instructing one or more nodes to use an in-memory hash table.

8. The computer program product of claim 7, wherein the tuning mechanism further comprises at least one of (i) implementing a parallel validation process; (ii) increasing a number of endorsing peers; (iii) increasing a number of transactions per node; (iv) reducing a number of node commits; and (v) implementing an event handling strategy.

9. The computer program product of claim 7, wherein the computer program product is further configured to repeat each step until the load parameter is above the predetermined threshold.

10. The computer program product of claim 7, wherein the predetermined threshold is based on a theoretical maximum throughput of the distributed computer network.

11. The computer program product of claim 7, wherein the tuning mechanism comprises at least restricting a memory hierarchy for fast data access, wherein restricting the memory hierarchy comprises instructing one or more nodes to use an in-memory hash table.

12. The computer program product of claim 7, wherein the tuning mechanism comprises implementing an event handling strategy, wherein implementing an event handling strategy comprises instructing the client device to change from a synchronous to an asynchronous waiting period.

13. The computer program product of claim 7, wherein capturing one or more load parameters associated with the distributed computer network comprises capturing one or more timings of one or more nodes in the distributed computer network, and wherein the computer program product is further configured to identify at least one of the one or more nodes as a bottleneck based on the captured timings.

14. A computer implemented method optimizing data acceptance and data storage in a distributed computer network, the computer implemented method comprising: providing a computing system comprising a computer processing device and a non- transitory computer readable medium, where the computer readable medium comprises configured computer program instruction code, such that when said instruction code is operated by said computer processing device, said computer processing device performs the following operations: identifying a request from a client device to initiate a transaction on a distributed computer network; capturing one or more load parameters associated with the distributed computer network; capture a transaction timing of one or more components in the distributed computer network, wherein capturing the transaction timing of one or more components comprises capturing a processing time of the transaction at the one or more components; performing a neural network analysis on the captured transaction timings of the one or more components; based on the neural network analysis, identifying at least one of the one or more components in the distributed computer network for optimization; and applying a tuning mechanism on the one or more components, wherein the tuning mechanism comprises at least restricting a memory hierarchy for data access, wherein restricting the memory hierarchy comprises instructing one or more nodes to use an in-memory hash table.

15. The computer implemented method of claim 14, wherein the tuning mechanism further comprises at least one of (i) implementing a parallel validation process; (ii) increasing a number of endorsing peers; (iii) increasing a number of transactions per node; (iv) reducing a number of node commits; and (v) implementing an event handling strategy.

16. The computer implemented method of claim 14, wherein the tuning mechanism comprises at least restricting a memory hierarchy for fast data access, wherein restricting the memory hierarchy comprises instructing one or more nodes to use an in-memory hash table.

17. The computer implemented method of claim 14, wherein the tuning mechanism comprises implementing an event handling strategy, wherein implementing an event handling strategy comprises instructing the client to change from a synchronous to an asynchronous waiting period.

18. The computer implemented method of claim 14, wherein capturing one or more load parameters associated with the distributed computer network comprises capturing one or more timings of one or more nodes in the distributed computer network, and wherein the computer implemented method is further configured to identify at least one of the one or more nodes as a bottleneck based on the captured timings.

* * * * *